United States Patent
Konkola

Patent Number: 5,541,385
Date of Patent: Jul. 30, 1996

[54] METHOD FOR GENERATING AND EXPLOITING A PLASMA BALL OR A SIMILAR PHENOMENON IN A CHAMBER AND THE CHAMBER

[76] Inventor: Seppo T. Konkola, Varastotie 11, Jamsa, Finland, FIN-42100

[21] Appl. No.: 157,006
[22] PCT Filed: May 28, 1991
[86] PCT No.: PCT/FI91/00166
§ 371 Date: Jan. 28, 1994
§ 102(e) Date: Jan. 28, 1994
[87] PCT Pub. No.: WO92/22189
PCT Pub. Date: Dec. 10, 1992
[51] Int. Cl.⁶ .............. B23K 10/00; H01J 7/24
[52] U.S. Cl. .............. 219/121.6; 219/121.43; 219/121.52; 219/121.57; 376/144; 376/122; 315/111.41; 315/111.71
[58] Field of Search .......... 219/121.36, 121.43, 219/121.54, 121.57, 121.85, 121.59, 121.52; 310/11, 10; 376/107, 144, 146; 315/111.21–111.71

[56] References Cited

U.S. PATENT DOCUMENTS

| | | | |
|---|---|---|---|
| 3,120,475 | 2/1964 | Bennett | 176/5 |
| 3,160,566 | 12/1964 | Dandl et al. | 176/7 |
| 3,218,235 | 11/1965 | Ehler | 176/5 |
| 4,654,651 | 3/1987 | Shelton | 315/111.71 |
| 4,851,722 | 7/1989 | Zauderer | 310/11 |
| 5,026,681 | 6/1991 | Hed | 505/1 |
| 5,321,327 | 6/1994 | Jensen | 310/11 |

FOREIGN PATENT DOCUMENTS 0019668  12/1980  European Pat. Off.

Primary Examiner—Mark H. Paschall
Attorney, Agent, or Firm—Chilton, Alix & Van Kirk

[57] ABSTRACT

A method for generating a ballshaped plasma or similar phenomen in a spherical chamber (8), where fuel gases are supplied through the jet nozzles (2a,2b), bringing the plasma ball into rotation. The ionization of the gases is started and maintained by electric discharge and/or laser energy. Magnetic fields are provided through pole pieces (4a,4b,6a,6b), one field of which is rotating in accordance with the plasma ball rotation. A chamber (8) for carrying out the method is also disclosed.

15 Claims, 4 Drawing Sheets

5,541,385

METHOD FOR GENERATING AND EXPLOITING A PLASMA BALL OR A SIMILAR PHENOMENON IN A CHAMBER AND THE CHAMBER

BACKGROUND OF THE INVENTION

The invention relates to the generation of a gas/plasma ball in a special chamber, into which hot ionized gases are conducted.

Ball lightning phenomena is known as a natural phenomenon during thunderstorms. As far as is known, it has not been possible to generate the phenomenon by experiments and therefore also not to exploit, i.e., beneficially control and utilize, its practical properties. Even this invention does not bring a solution either to the origin of the ball lightning or to the question of what sustains the gas/plasma ball formed by fire gases of cable surface oxidation ignited on power lines by corona discharge and which can land on the ground and continue moving. Thus far it is understandable that no solution was reached, as the voltages and rates of current in the lightning are greater than on power lines.

SUMMARY OF THE INVENTION

The gas/plasma ball generated in accordance with the present invention has a much greater density and cannot be sustained without chamber walls, the charge of which bears the same polarity as the gas/plasma ball, thereby pushing and centering the ball. With this counteraction the gas/plasma ball is sustained in the chamber. Further, in the free air space around the power line there is not a pressure as high as would be necessary at the ignition moment. With the method and chamber according to this invention, a decisively better final outcome is reached in generating the phenomenon and in controlling the chargings and energy flows in the phenomenon.

The method according to the invention is characterized by the steps of feeding gas flows into the chamber in the form of ionized burning gas flames, generating an electric arc by means of opposite electrodes in the chamber wall, essentially on the axis of rotation of the gas ball, and feeding energy, preferably by a laser beam, into the electric arc.

The major advantages of the invention can be considered that generating, maintaining and processing the gas/ball plasma are mastered under control in a closed chamber, whereat the inter-actions of the high densities of charge and magnetism and phenomena thus induced can be observed and binding the energies displaced.

BRIEF DESCRIPTION OF THE DRAWINGS

In the following the invention is described in detail with reference to the accompanying drawings, where.

DESCRIPTION OF THE PREFERRED EMBODIMENT

Figure 1:
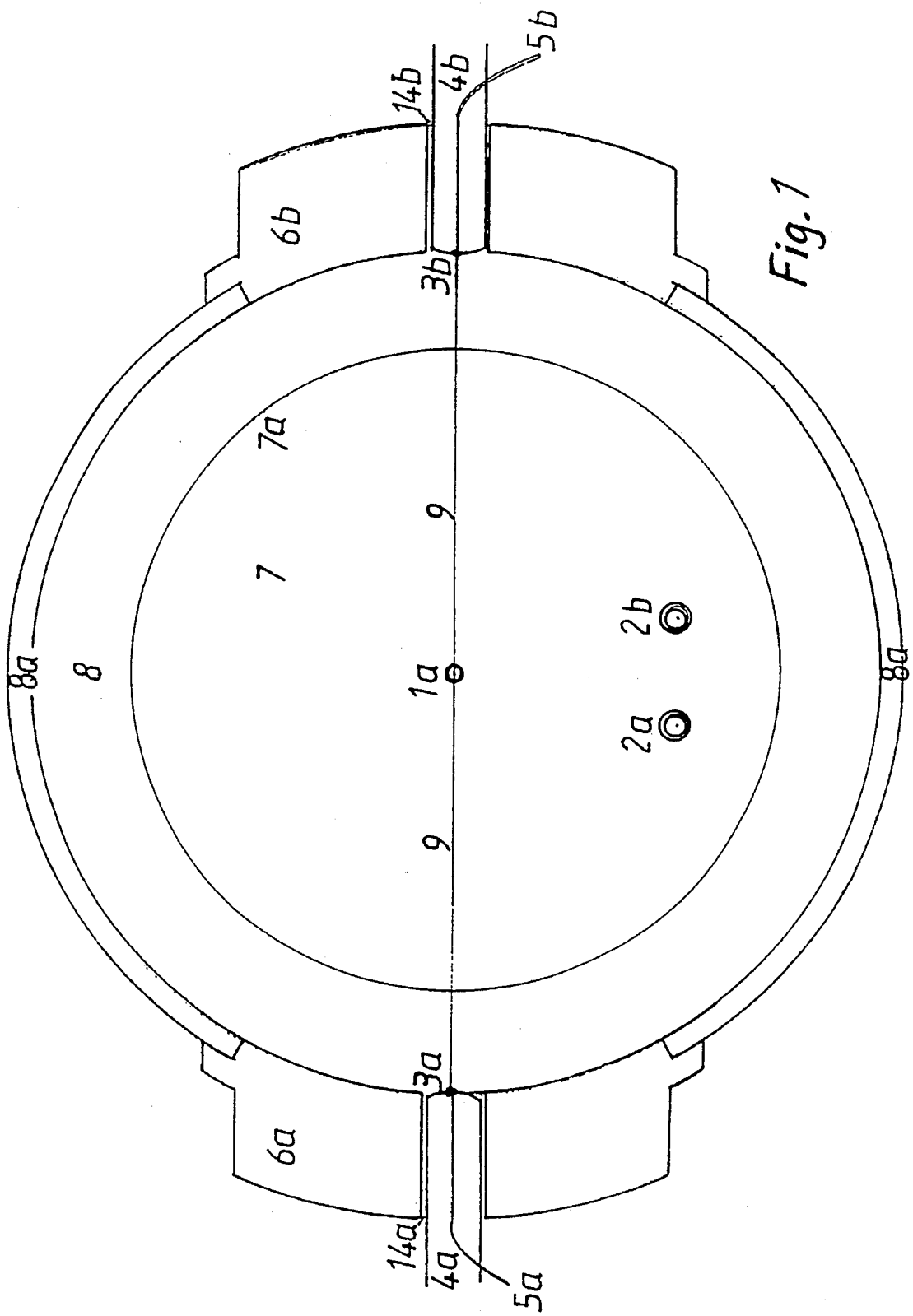
FIG. 1 shows a principal drawing of a chamber.

FIG. 1 shows a chamber 8 with an insulated wall 8a. The chamber enclosure is a transparent bulb 7 the outer periphery of which is marked 7a. Structures 6a and 6b are rotating magnets. Structures 5a and 5b illustrate conductors, between which a discharge 9 is generated between electrodes 3a and 3b. 4a and 4b are fixed heads of magnets with different poles insulated from the conductors 5 which can however be moved towards the chamber. From jets 2a and 2b flames enter the chamber. Laser beams are shot to 1a in discharge 9.

Figure 2:
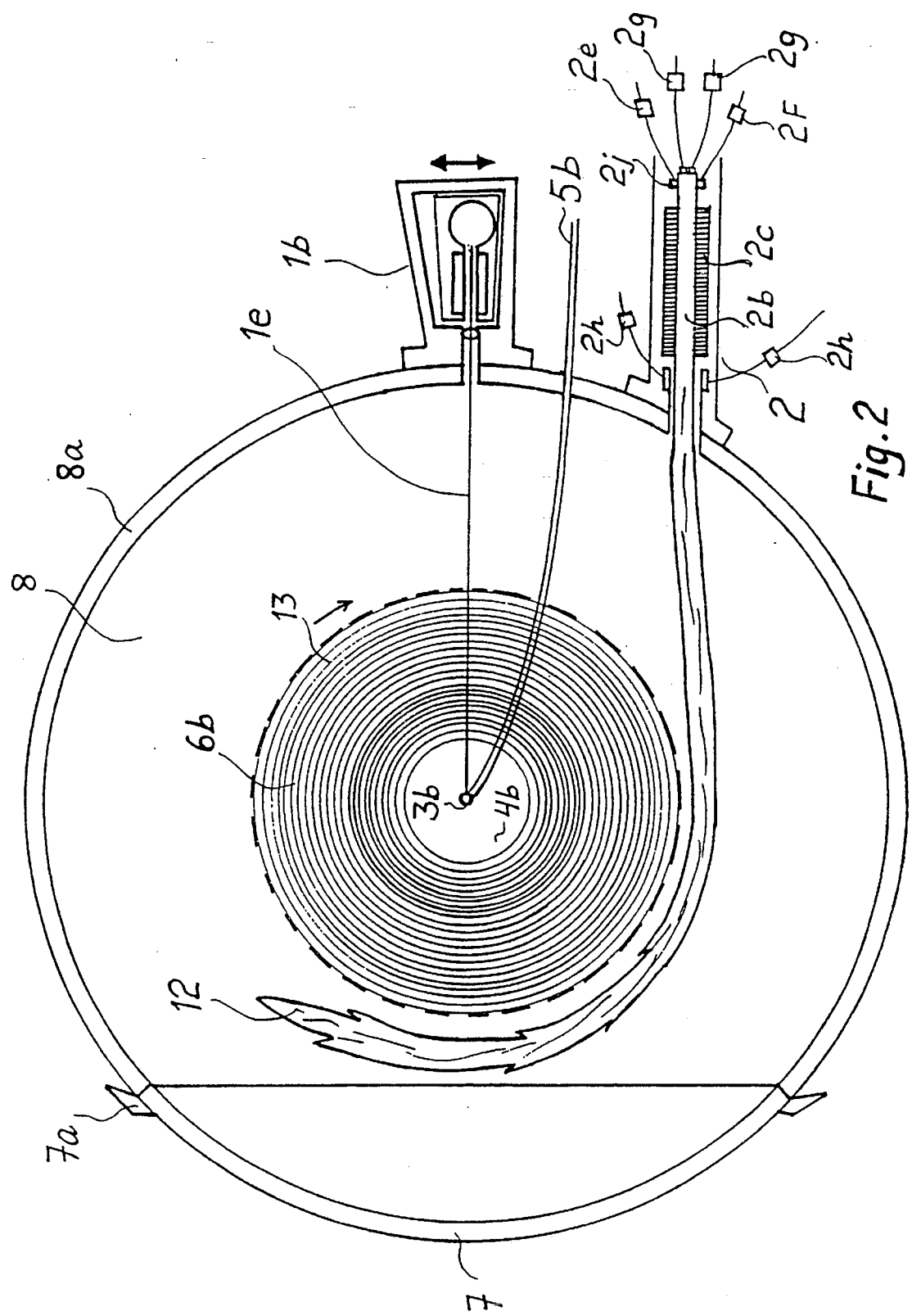
FIG. 2 shows a side-view of a chamber.

FIG. 2 is a cross-section of chamber 8. The chamber enclosure is a transparent bulb 7. Flame 12 from jets 2 curves to the circular orbit. An eddy magnet field is formed in the chamber on rotation of the magnet 6 The laser beam 1e is shot by laser gun 1b, by means of which the beam can also be directed. In jets 2, there are fuel pumps 2g for main jets and 2e and 2f for the peripheral jets. There is a current ionizator around fire duct 2b.

Figure 4:
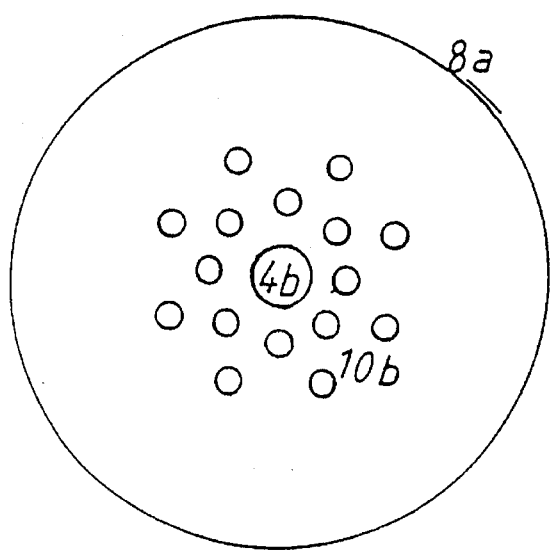
FIGS. 4 and 5 show the arrangement of magnets in the chamber.

FIG. 4 shows the arrangement of magnets. The magnets are isolated from the chamber wall. Bar magnets 10b are placed at the chamber sides.

Figure 5:
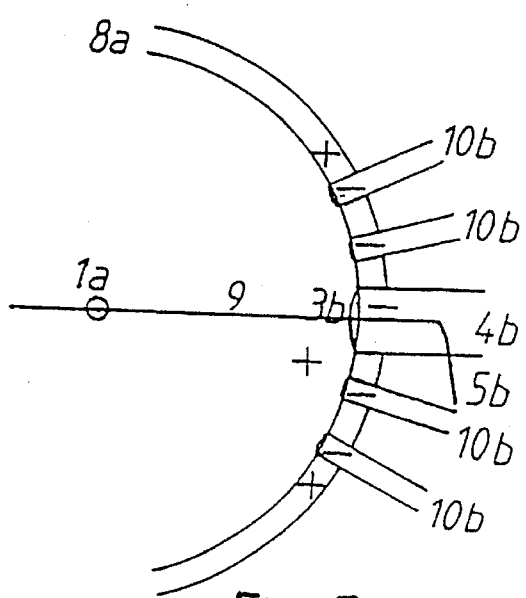

FIG. 5 illustrates the same but viewed from the front. 8a is the chamber wall. 9 is an electric discharge from the head 3b, 4b a fixed magnet and 5b a conducing wire.

Figure 6:
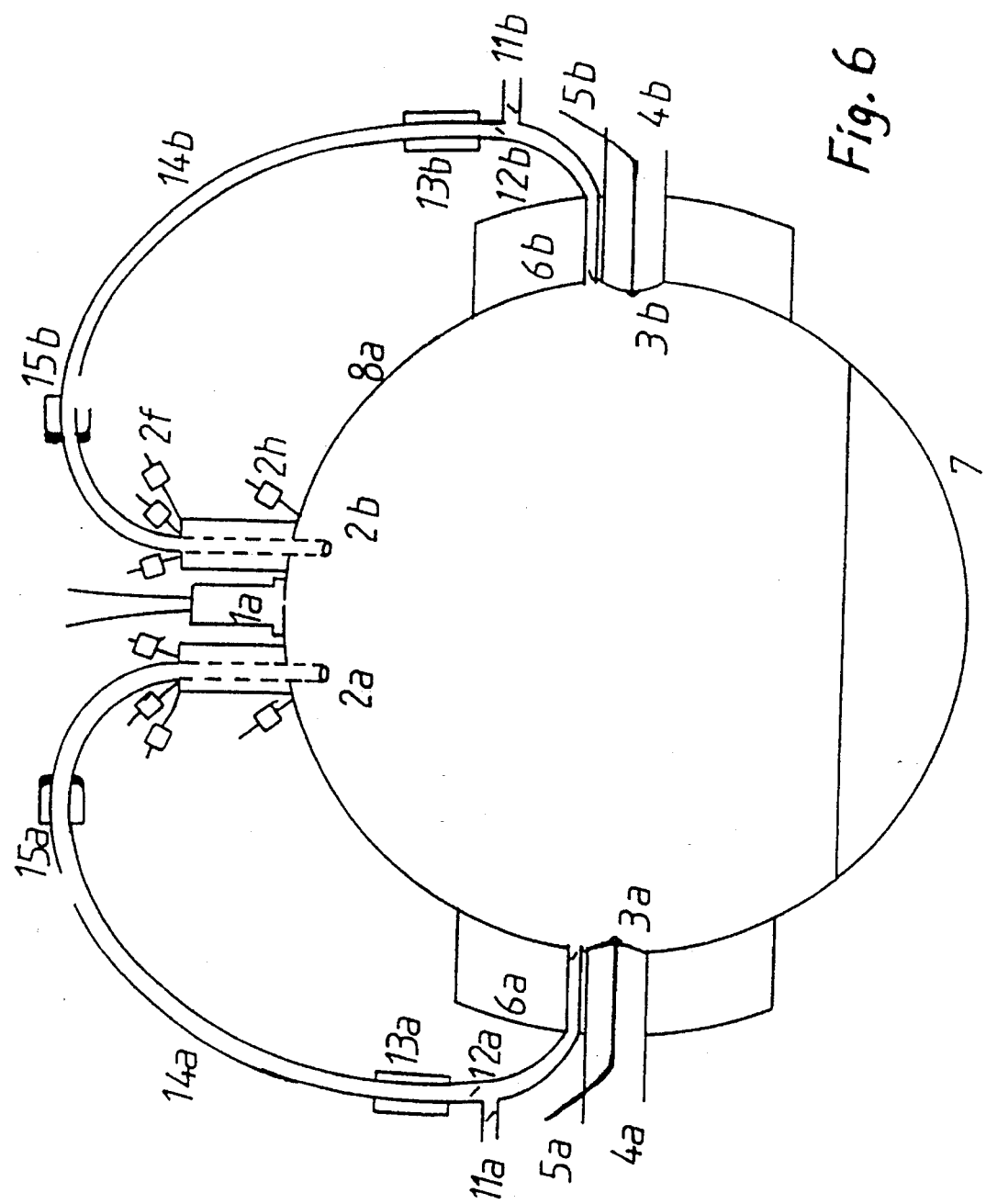
FIG. 6 shows the principle of back circulation of gases.

FIG. 6 is a schematic view of the back circulation of fire gases. The fire gases escape from the chamber 8 through the space between magnets 4 and 6 along circulating tubes 14a and 14b. The tubes are provided with compressors 15a and 15b for increased rate of flow and pressure. By means of valves 12a and 12b fire gases can be diverted to the ducts 11a, 11b or conducted to circulation.

The method comprises a chamber with the possibility of back circulation through jets, whereat the back circulated fire gases are processed with current ionizators. The method has developed partly based on observations by my own experience of the influence of a static field on long flames and observations about cable surface oxidation ignited by coronary discharge on power lines, whereat the fire gases generating thereby have taken the form of a gas/plasma ball. A similar gas/plasma ball is produced in the chamber described herein.

The chamber function as a multi-phase process and, furthermore, the different stages of functions are dependent on used fire gas mixtures and the pressure in the chamber and the intensity and polarity of used magnets. An important process for the chamber function is the back circulation by fire gases or by other similar methods through the jets of the current ionizators. Then the burning fire gas particles are put into such a state with respect to their electric charge that they stick to the particles in the chamber forming together a gas mixture of such a greater density which can be controlled by means of magnets at the sides in the beginning stage of function on starting the chamber operation. The process schematically illustrated in FIG. 5 can be described by means of paint sprays, in which such an electric charge is produced in the paint drops that they stick to the surface which is being painted. On the other hand, the charge in the chamber walls is of such a rate that the fire gases do not stick to them but to other gas particles in the chamber, which are set into rotation by means of magnets at the sides. In this stage the inner jets are in use, in which burning takes place partly in the jet so that a portion of oxyden has already been consumed upon entering the chamber. From here on the proceedings are described on basis of observations through the transparent bulb.

By the means of this method a gas/plasma ball can be generated under control, a ball similar to the one originated from fire gases of cable surface oxidation as a result of corona discharge on power lines and partly from exhaust gases of a motor running under the power line and from gases rising from marshy terrain and from air surrounding the power line, which made the corona discharge electrically charged.

On starting the Jets their flame is adjusted according to FIG. 2 in the the same manner as flame 12. Partly because of difference of temperature and partly because of the influence of the gas mixture functioning as medium in the chamber and because of the effect of chamber pressure, the flame starts to rise as shown in the figure and curves around the field formed by magnets seen at the sides of chamber. In this stage charging of static electricity starts to raise in the chamber and in the gas mixture circulating in it. The chamber wall must be properly insulated as well a the jets and the back circulating pipes with fittings. This because a voltage of same rate as a lightning may generate in the chamber.

Already at this stage interactions may be active among gas particles rotating in the eddy current in the chamber. Change of direction causes the formation of a quantum of electromagnetic radiation. Simultaneously, there is internal conversion and electromagnetic displacement, internal excitation and interaction between radiation and the gas that is functioning as medium. During this stage no interactions are allowed to develop to a degree so high that it would lead to uncontrollable discharges in the chamber. The gas mixture of the jets must also be so adjusted that it ensures clean burning and prevents formation of soot. Some of the fire gases are let out through the valves in the tubes. On increasing the static charge in the chamber gases, the composition of gas in the chamber must be of that quality that the portion of oxyden is so small that explosion is not possible. In gases generating through burning the static charging can be increased so much that when the charge is rising the interactions between gases are starting to be apparent as light and the gases start to become red-hot, photoelectric phenomena occur as in corona discharges. Simultaneously, the density of gases keeps growing and the power fields become denser in the plasma ball which is also becoming denser.

This stage requires great amounts of electric energy and in the high voltage cable during corona discharge while surface oxidation is burning, there are successive dotlike flashings, from which finally such a charge is absorbed in the particles around them and such a power field density that a constant growing structure is formed in the ball. In the chamber the ball is increased to a size almost as big as the chamber. The dotlike flashings in the stage of generation are presented in Tekniikan Maailma 1989 No. 17 page 53 par. 33. But the Swiss did not have this other equipment described in the following.

In this chamber the power line is replaced with electrons at the chamber sides, between of which a constant electric discharge is produced. The electrons must be isolated from the other part of the chamber and the chamber function so that discharge can take place without disturbing the function.

Between electrodes $3a$ and $3b$ electric discharge is maintained and by means of jets the composition of fire gases so adjusted that a glowing plasma ball is produced. The capacity of the jets must be so great that during the 5 to 10 sec. stage when the plasma ball is growing bigger a sufficient quantity of fire gases can be produced in the chamber. Therefore, around the inner jets there are greater peripherical jets adjacent to the chamber surface directing their flames diagonally through holes in circumferential formation into the inner flame making the flame produced in this manner in the pressurized, charged inner gasses to a whirling wake of flames with its own internal magnetic field power, which produces a long ropelike flame. The flame starts rapidly to twist spirally against the chamber sides. This is a rapid phase. The procedures described at the beginning, where the flame has been only in the inner jets, can be constantly maintained, gas mixtures varied and the growth of the static charge in the chamber observed. The charge voltage is greater in chamber gases than in the wall and the direction is towards the wall. On igniting the peripherical jets, their effect and the gas mixture must be of such kind that in the chamber the following procedure is started within 10 seconds or faster.

The procedure gets visibly started by ignition of the jets (FIG. 2). The flame is seen yellow and illuminating the transparent pressurized gas in the chamber. When the flame effect grows, its top starts to rise in front of the glas bulb and the jets themselves are hidden out of sight by the flame. The flame tops are swaying tongue formed rather slowly to and fro from the left to the right pulled by the magnets. By further increase of intencity, the flames begin to circulate the chamber halves making ab. two or three turns twisting spirally and gently sloping against the chamber sides on both sides. In this stage it is still possible to see the previously mentioned spirally twisting flames. From here on the effect is increased strongly, the brightness of the jets is intensified so much that they become visible behind the flame for a while and also the peripherical jets are ignited and directing their flames diagonally to the flame of the centre part of the jets. In this stage the bright gas mixture in the chamber starts to mix with the flame. At first, when the shell jets ignit, the chamber brightens up for a while when the gas in the chamber starts to mix whirlingly with the flame changing the flame into a grey whirling spiral band circulating the chamber halves. The band makes over a dozen of turns before coming into the chamber sides and winds itself to several similar strata in the chamber. This occurs because of temperature difference of flame gas in the chamber and reactions when gases meet as well as the influence of centrifugal, gyroscope and magnetic forces and different charges in gases. The gases are so close to the chamber wall that the flame of the jets is visible vaguely gleaming behind the gas mass which is formed into a whirling turbulence and vertically arranged strata. The strata becomes more dense, the eddies in strata smaller and the spinning speed grows when the gases have reached a sufficient density, whereat (as per FIG. 1) an electric discharge is generated between electrodes $3a$ and $3b$, prevailing as greenish yellowy discharge and gets stabilized in its place. The discharge moment is then produced by an uninterrupted laser beam shot to the discharge centre. On starting, the chamber the jets are ignited and held on small intensity while the flame is rising over the middle of the chamber and by this intensity it is possible to try, at first, different gas mixtures as fuels and observe the composition of generated gas mixtures in the chamber. According to my observations the fire gases should be as clear as possible. At this stage of testing fire gases can be dissipated from the sides of the chamber. On increasing the efficiency also current ionizators are generated on using the polarities for the chamber gases and energy supply be possible from the glowing plasma ball in form of magnetic energy.

Before electric discharge and use of laser, the fire gases have got, through growing density of particles, internal field power of their own and due to the influence of this power and magnets in the sides of the chamber the fire gases have settled as groups of discs parallel in both chamber halves. Between the groups in centre of the jets there is an emptier space wherein also fire gases are floating and are as to their charge in such a stage that they have not yet shifted to either half of the chamber. Beccause of centrifugal and gyroscope forces and the magnets in the chamber sides, the state in the chamber is in accordance with FIG. 3.

Figure 3:
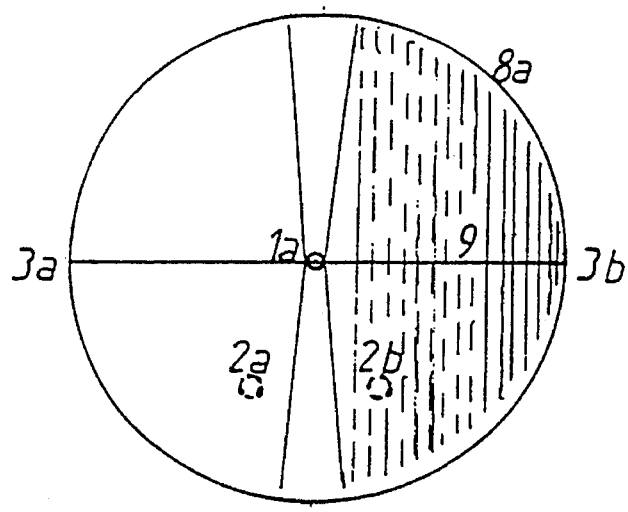
FIG. 3 shows gas discs in the chamber.

In FIG. 3 all the disclike rings 9 have a charge slightly different from each other. At the same moment the electric charge is let between 3a and 3b. When the discharge is stabilized a laser beam is shot from the less dense space between the jets to the middle of the electric charge and the laser beam is continuous till the ignition of the solar fire and also continuous when the gaff/plasma ball is growing. Similarly, the electric discharge is kept in function at the initial stage. It brings additional high voltage current to the glowing gas/plasma ball folding around the growing bright initial ignition point. At first the electric discharge functions as linear electric current around which the gas/plasma ball is growing at first. The electric discharge enables absorbation of the laser power in the impact point so that a glowing gas/plasma ball begins to generate. From the electro-magnetic-chemical phenomenon a huge energy charge is absorbed into the ball, a charge wich is to its duration slowly lessening and surrenders its energy through radiation. The quality of radiation depends on applied fire gases and the particle density in the growing gas/plasma ball is great. The jets thrust fire gases with rocket type efficiency in the chamber, where they hit the gas/pasma ball periphery and start the mixing of gas fire particles with particles charged in the gas/plasma ball and winding themselves as diminishing circular orbits towards the ball center turning into magnetic energy and radiation. The gas/plasma ball has reached it full size and does not touch the chamber walls, because after reaching a certain size, the ball stops growing because of rejective magnetic influence. Parallell with the growing of the ball, magnetic polarity is generated, which already existed in the fire gases in the initial stage. In this connection there is reason to revert to the observation of an interface of gas/plasma and air, where something goes on producing a reaction which forms something like a light reflecting film at the interface on the surface of the artificial gas/plasma ball. In this procedure gases are shifted from the air into the gas/plasma ball and obviously this procedure produces also a portion of the gas/plasma ball energy.

In the chamber a similar phenomenon is generated by the fire gases on hitting the gas/plasma ball in the chamber. The gases are tested with respect to their adaptable composition. The color and brightness of the glowing gas ball alternate on changing the jet efficiency and composition of the fire gases and, especially, when taking out power as radiation through the transparent bulb.

In addition, the radiation Dower can be momentarily raised in disturbing the internal stability of the ball by means of a to and fro moving permanent-action laser which causes, deeper as the ball surface, an interruption in the energy stability and discharges thus faster energy contained in the ball. This must be applied in the final stage on extinguishing the ball and also on reducing the power of the jets at the same time. A phenomenon was also observed, where fire gases that had got into the gas/plasma ball vanished during the procedure most likely because of catalytic influence.

The chamber pressure is varied according to need and no certain maintainable pressure rate is determined. The chamber wall is of material in which a field charge can generate to keep the glowing ball off the wall. The chamber wall must conduct well magnetic energy charged in the chamber for tramsmission to practical application.

Start-up of chamber and the time needed till the moment the ball commences to grow is less than 10 seconds and does not at this stage require cooling of the chamber, since the temperature does not have time to rise to a detrimental level. The experimental stages can be carried out without cooling, especially if the generating energy can be dissipated. A great as possible magnetic and radiating energy production is strived at. This is based on the estimation that with gases contrary to metals high electric and magnetic energy charges are reached without the resistance phenomenon in metals, which causes rise of temperature. This is confirmed by literary data about ball lightnings which are not warm. Further I have an estimation that when the energy level in gas has increased sufficiently, the lightning is only magnetic and this phenomenon can be generated in a chamber like this, because the chamber enclosure must be insulated also to the outside. If cooling is needed, it has to be arranged on the outside of the chamber.

Around the fire ducts (FIG. 2), arranged after the jets, there are current ionizatores for energating charge in the fire gases and at the chamber end of the fire duct there are bigger jets on the periphery, by means of which an eddy property is produced for the fire gases. The fuels have to be tested, which is one of the purposes with the chamber. Different fuels, a.o. hydrogen, methane and corresponding fuels as clean as possible that produce fire gases. The main objective is to generate, at first, a glowing ball in the chamber and then start with experimental feeding of different gases through the fuel pumps of the jets and test different gas mixtures since powers which actuate the magnet and the mobile charges are also dependent on the material where the field is. Here the gases offer a quite different possibility for trying than metals, since it is much easier to make changes in the gas mixtures inside the chamber and also to add new gases, for example noble gases, through the jets.

The phenomena in a gas/plasma ball are partly the same as for example in a thundercloud, where raindrops induce continuous growth of charge. A corresponding procedure in the cahmber is the fire gases hitting the surface strata of the ball, whereat particles with different charges meet. Partly, photochemical reactions are also active but surely there are also others powers like the Lorenz power in action. In experimental sense there would be the possibility to try Palladium for coating. Part of the functions in the chamber are due to catalytic affects in the gases. The most important process sustainer (similar to par. 31 and 32 on page 7 in the reference book) is the process in the atom of the glowing gas ball, around which the ball has origninally been formed and, in this case, the energy induced through this procedure is convereted into charge in the surrounding gas ball. The laser is seen in FIG. 2, its alignment must be turnable, and the laser movable to and fro in the initial ignition stage at 1a and on extinguishing the chamber. Further, the laser must be of such a quality that ignition of a solar fire (similar to par. 33 on page 7 in the reference book) takes place.

Further, an observation has been made according to which the gas/plasma ball stirred up dust from beneath, may it be caused by a certain electric field around the ball or the stirring up dust, because of the fact that the gas/plasma ball has with certain gas compositions a magnetic field of its own, which is reverse with respect to the magnetic field of the earth. The observation is sustained by literally data about bouncing ball lightnings.

According to FIGS. 4 and 5 the objective has been to preserve the cohesive force of the glowing ball in order to maintain the form of the ball and that there would be no contact to the walls when taking out energy from the chamber to the magnets 4a, 4b, the differently named electrode of which is isolated from the chamber wall and which is in the chamber inner surface and which in the testing stage can be moved closer and farther from the glowing ball. By a different name different polarities are meant on testing the polarity of the glowing gas ball. The insulated chamber wall has in its turn with its static charge a similar polarity as the arrangements above as per FIGS. 4 and 5 with the difference that the magnetic bars are directly coupled to the uninsulated outer chamber surface and insulated together with the chamber while the energy is taken through the magnets as per the arrangement in FIG. 1.

On extinguishing the chamber, the quantity of gases from the jets are reduced and the ratio of mixture adjusted so that the portion of radiation produced by the process is diminishing while the portion of the magnetic field is growing. When the power is still slowly lowering, the bulb gets smoothly cooler. In appr. tree to four minutes the bulb cooling is so far advanced that the bulb begins to change from red-heat to transparent and the same yellow flame, circulating spirally to the sides, becomes visible and in this flame the swaying from one side to the other, mentioned at the beginning of this paper, becomes apparent. The plasma is in form of a red-heat ball with strongly dark red color. The plasma rotates still around the x-axis. As at the beginning, the stratification of the plasma is clearly distinguished due to the darker and bright particles, which are spinning in the plasma and drawing circular lines in different strata while spinning with the plasma. The particles of different colors are caused by interactions by means of which the fire products from the jets turn to radiation during the process. When the cooling goes on, the plasma turns evenly red-heat and after ab. 4 minutes, when the bulb has turned transparent during cooling, the plasma begins to turn into transparent gas. Then a flame, as described in the beginning, is visible. It is extinguished in a reverse order than at the beginning.

The function, force and polarity of the magnets at the chamber sides are so adjusted that the chamber can be put into function as described. On experimenting gas mixtures it has to be taken into consideration that even if the charge in the chamber is static and marked with +, also − marked charge, as result of interactions, can be generated there.

Through the transparent chamber bulb energy radiation of such kind, which is not necessary for the chamber function, can escape. The practical application of radiation is being studied. Further, the excess light generated by interactions escapes through the bulb. Photons are independent of the light.

When a glowing gas/plasma ball has been generated in the chamber, it is possible to analyse interactions between all known gases under the chamber conditions when the gas/plasma is adopted into practical application with different pressure rates and field powers (megnetic field, radiation field etc.). In the following examples from the book INSTRUMENTTIANALYYTIKKA No. 6. Page 14, par. "Multiplication of Ionization" is an analysis how the kinetic energy of free electrons can exceed the energy necessary for the ionization of gas molecules when the field power is high enough.

Further on page 115 before the examples, it is described how the dependence on primary ionization fades when the field power continues to grow and even one electrone-ion pair is sufficient to induce electric discharge. The objective is to achieve just this kind of self sustaining electric discharge as a controllable phenomenon in the chamber. It must be so interpreted that the anode and the cathode are on the sides in the plasma gases and in the ball and on the chamber walls only indirectly through focusing magnets. Further, many known interactions take place in the chamber simulataneously, a photo-electric phenomenon becomes visible, which is described in the reference section as different colored fire gas particles circulating an uniform circular orbit that is growing smaller. Page 78 The Photo-Electric Phenomenon. In the following a list of phenomena active in different stages in the chamber, from the said book.

Interactions p. 49, Area of Mass Action p. 50, Change of particle direction induces generation of a radiation quantum p. 53, Amount of Particle Collissions p. 53, Ionization Capability of Particles p. 56, Energy Delivery of Ions p. 57, Energy Delivery of Electrons p. 64, The massive braking capacity is great while material in gaseous state p. 66, Photon radiation always parallel with beta radiation, Interactions of electro magnetic radiation p. 77, The Forms of Interactions between Photons and Mediums p. 78, In elastic Scattering of Photons. p. 81, Importance of Photon Interactions p. 85, Multiplied Scattering of Photons p. 89, Neutron Interactions p. 95, Ionization produced by radiation absorbation in gases p. 109, Motion of Charged Particles in the Electric Field p. 111, Multiplication of Ionization.

The functions of a plasma ball are described in the book MODERN UNIVERSITY PHYSICS, where on pages 479, 480, 481 and 483 the active forces on mobile power in the magnetic field is presented.

In Readers' Digest January 1991, page 122 there is an article with the headline "A Storm of Colours in the Sky" about polar lights and on page 125 the real origin of polar lights is presented, a giant electronic cannon induced by particles slung from the sun when they collide with the magnetic field of the earth and induce electric currents. The interaction between solar wind and magnetic fields of the earth is like a giant generator, which accelerates particles. According to the present conception, there are similar phenomena between fire gases from the jets and plasma ball particles.

In addition to the interactions described above, the objective is to study the origin and influence of Alfa radiation in the chamber under different pressures and with different gas mixtures and electric field powers (pp. 11 and 12 in the reference book); Ionizating Power and Shelter, Beta radiation, generation and its impact under varying conditions in the chamber, Generating neutron radiation and gamma radiation and their impacts under different conditions in the chamber.

The real objective with the chamber is to achieve the best possible coefficient of efficiency with used fuel mixtures. The summit is nuclear integration, i.e. a fusion, which is possible only between lighter elements, such as hydrogen and lithium. The high temperature, necessary for start-up the fusion, is a problem. With this chamber it is possible to drop the temperature in inducing the atoms into a high charged field, where they are arranged in ball form in the gas mixture, in which start-up is carried out by means of a high power laser shot dotwise to the ball centre in the middle of the electric discharge, which brings together with the laser necessary energy to the absorbing point. Simultaneously, in the gas mixture in the chamber there is both electric charge and discharge of particles, depending on the gas composition and the charge and charge differencies. Everything must be possible without disturbing the ball cohesion but producing energy. In applying energy the phenomena in the chamber are under control.

Application of energy can be controlled for example in sustaining the composition of gases in the gas/plasma ball in such a form that the ratio of gas active as medium and charging substance is so high that the interactions between energy delivering gas particles cannot grow beyond control. The rate of particles delivering energy must be so sparse that the discharging energy is absorbed into the medium and is due to these interactions discharged more slowly and under control. At the present, by means of this chamber the use of a to and fro moving laser, the practical application of which is presented on page 9 of this paper, is studied as permanent action means inducing disturbance in the ball stability under the gas/plasma ball surface and generating energy discharge in gas particles which are narrowly hitting its light beam, the energy discharge being absorbed around itself while sustaining the energy producing procedure in the whole ball, which is described in this presentation. The laser is seen in FIG. 1, above $2d$. In this way, in the functioning ball on a small area the generation of a fusion is tested in gas particles hitting the laser light beam, and the heat and energy radiation generated hereby are absorbed, under control, around itself in gases functioning as mediums and comes, under control, to pratical application through the process in the gas/plasma ball. In this connection, with gases fed through jets the cooling is tested so that the the need of cooling would be as small as possible. At the transparent bulb radiating films or corresponding means are used, wherein it is possible to get a similarly marked charge as into the chamber walls.

The cohesion of the gas/plasma ball is also dependent on the composition of gases from the jets, which affects the interactions between gases in the gas/plasma ball. Thereby both + and − charge is induced. Regularly, there is + charge and direct current in the gases. When, on starting the chamber, the charge of static electricity is growing, back circulation of gases is used, in connection of which burning gases are processed with a current ionizator in such a way that they are charged into a state where their particles stick to particles which are already in the chamber. The chamber and the jets must be so insulated that a rejecting force is induced in the Chamber walls with same marking as the gases in the chamber. It is possible to raise in the chamber a voltage of same grade as in the lightning and the insulation has to be of a quality that breakdowns beyond control are not possible. Likewise, the magnets and polarities must be adapted according to the stages of chamber function so that the plasma ball remains focused in place during the different stages. In the initial stage, energy is fed from the outside. When the density of the gas/plasma ball is growing and the charge increasing inside the gas/plasma ball, the interaction between particles starts to produce energy (Ionizating Radiation and Sheltering), which comes partly magnetic through the chamber walls and partly as radiation through the transparent bulb. Energy, generated in this stage, is replaced by gases entering the chamber through the jets. During the process there is in the chamber such a compostion of gases, in the stability of which both charging and discharging takes place for energy production.

Beside solving the the energy production, it is possible to solve by means of the chamber in every stage of its function the effects of interactions whch are differently active within these spaces of great energies than on lower energy levels. In order to solve this question I refer to the book INSTRUMENTTIANALYTIIKKA; P. 95 All neutron interactions are bewteen neutrons and atoms, the products of these interactions, charged particles, recoil atoms and indirect photons are responsible for ionization of the atoms of the medium. Even the neutron is indirectly ionizating radiation. Page 78 The photon-electric phenomenon is an interaction between photons and the electron atmosphere. Page 79 The quantums of x-radiation are absorbed in the adjacent atoms. Page 44 The internal conversion connected with electromagnetic displacements is an electromagnetic interaction between the excitated atom and the electron atmosphere around it, which conducts the excitation energy of the atom to one of the electron atmosphere electrons, which is detached from its bondings and leaves the atom. Page 57 Interactions between ion cores, scattering from the core and nuclear reactions are of no importance with respect to absorption with exception of the area of the greatest energies. Exactly this kind of interactions are the ones which can be solved in the chamber. When the gases in the chamber have become ionized into electricity conducting plasma, a process like the dynamo theory starts in the ball. This stage must be taken into consideration in the function and polarity of the magnets. The nested jets are furnished with current ionizators, the meaning of the most inner tubular jet is to enable already partial burning and decrease of oxygen before the fire gases enter the chamber.

I claim:

1. In a method for generating a statically charged gas plasma ball in an insulated chamber containing a mass of electrically charged gaseous particles, and in which a magnetic field produced by an outside source is allowed to act on the charged particles in the chamber, while gas flows are being fed into the chamber so as to bring the gas mass into rotation, whereby the charged particles produce a magnetic field due to the rotation, and whereby electrodes and magnetic poles connected to the chamber wall control the ball and the discharge of energy from the chamber when the plasma ball is generated by feeding energy into the mass of gas wherein the improvement comprises feeding of said gas flows into the chamber in the form of ionized burning gas flames, and generating an electric arc by means of opposite electrodes in the chamber wall, essentially on the axis of rotation of the gas ball, said energy being fed into the electric arc.

2. A method according to claim 1, wherein, at the generating stage of the gas ball, gas flames ionized with the same polarity are fed at different sides of the central plane of the ball, producing two spaced, outwards diminishing ball halves formed of disc-formed layers, and said energy is a laser beam directed between the ball halves.

3. A method according to claim 1, wherein, the generation of energy is controlled by means of the gas composition of the gas flames and the gas amount.

4. A method according to claim 1, wherein a portion of the chamber wall is designed so as to allow the generated photons to be removed through it.

5. A method according claim 2, to wherein the electric discharge and the laser beam are maintained until the plasma gas ball is stabilized in the chamber.

6. A method according to claim 1, wherein, the energy of the plasma gas ball is transferred outside the chamber by using at least one of the following group of transfer means consisting of an electromagnetic undulating motion, an electric discharge, a hot material, and conduction.

7. A chamber for generating a statically charged gas plasma ball phenomenon, the chamber having a wall in the shape of a circular or elliptic ball, and magnetic poles ($6a,6b$) being provided at two opposite points of said wall in order to generate a magnetic field in the chamber, the chamber wall additionally including jets ($2a,2b$) offset from the central plane of the chamber for blowing gases into the chamber and gas outlets ($14a,14b$) being provided elsewhere in the chamber wall, the gas jets ($2a,2b$) and the outlets ($14a,14b$) being optionally integrated in a hot gas circulating system, and the chamber being provided with means, which can include said magnetic poles (6a,6b), for discharging the generated energy in the chamber in order to control the stability of the gas plasma ball in the chamber, wherein the improvement comprises that said gas jets (2a,2b) are provided with ionizing members (2c), the gases having the form of already ignited flames at the point of the ionizing members, opposite electrodes (3a,3b) are provided at the point of the axis of rotation of the generated plasma gas ball in the chamber wall in order to produce an electric arc on the said axis, and the chamber wall includes a laser gun (1b) that can be directed into said electric arc.

8. A chamber according to claim 7, wherein two gas flame jet sets (2a,2b) are disposed on the same side of the central plane of the ball viewed laterally, but on different sides of the central plane perpendicular to the axis of the ball.

9. A chamber according to claim 8, wherein each jet set comprises a a central jet and peripheral jets, to regulate the gas mixture output.

10. A chamber according to claim 9, wherein flue gas outlets (14a,14b) are placed in the vicinity of the chamber ends.

11. A chamber according to claim 7, wherein the electrodes for electric discharge (3a,3b) at the chamber ends are surrounded by magnetic poles (6a,6b).

12. A chamber according to claim 7, wherein at least one pair of magnetic poles (4a,4b) at the chamber ends are axially mobile to control the plasma gas ball.

13. A chamber according to claim 7, wherein the chamber wall comprises several electrodes to adjust the distance of the ball from the chamber wall.

14. A chamber according to claim 7, wherein at least a portion (7) of the chamber wall is transparent and coated with a conductive layer.

15. A chamber according to claim 7, wherein the chamber wall comprises several magnetic poles to adjust the distance of the ball from the chamber wall.

* * * * *